United States Patent [19]

Kelley et al.

[11] 3,967,394

[45] July 6, 1976

[54] AUTOMATIC GRAB CRANE

[76] Inventors: Charles S. Kelley, 253 Bradwell Rd., Barrington, Ill. 60010; James A. Westlund, 1685 Portage Pass, Deerfield, Ill. 60015

[22] Filed: Sept. 23, 1974

[21] Appl. No.: 508,274

[52] U.S. Cl..................................... 37/71; 212/42; 37/183 R; 37/DIG. 1; 175/45; 214/656; 60/445; 60/905

[51] Int. Cl.$^{2}$........................ B66C 3/00; E02F 3/88; B65G 47/00

[58] Field of Search..... 37/71, DIG. 1, 54, 182–188, 37/195; 60/DIG. 2, 905, 487, 445; 254/172, 173; 212/42, 44; 214/656, 658, 152; 294/110 R, 88; 175/45

[56] References Cited

UNITED STATES PATENTS

| | | | |
|---|---|---|---|
| 3,033,399 | 5/1962 | Conner et al. | 37/183 R UX |
| 3,125,819 | 3/1964 | Kaufmann | 254/173 R X |
| 3,310,158 | 3/1967 | Reilly | 254/172 X |
| 3,363,929 | 1/1968 | Nelson | 294/88 |
| 3,378,158 | 4/1968 | Lopez | 254/172 X |
| 3,381,939 | 5/1968 | Brown et al. | 254/172 |
| 3,523,614 | 8/1970 | Walker | 37/71 X |
| 3,768,263 | 10/1973 | Olson et al. | 60/905 X |
| 3,770,140 | 11/1973 | Dukette | 294/110 R X |
| 3,817,033 | 6/1974 | Appel et al. | 254/172 X |
| 3,864,915 | 2/1975 | Metailler | 60/905 X |

*Primary Examiner*—E. H. Eickholt
*Attorney, Agent, or Firm*—Watson D. Harbaugh

[57] ABSTRACT

A time saving automatic hydraulic control for that sequence in operations in which a grab excursioning out of sight of the operator, is sequentially lowered open to engage work material, closed to pick up a load, and then hoisted with its load and emptied. A logic circuit is activated to stop the lowering within an adjustable timed period after initial work engagement to provide desired penetration of the work material by the grab followed by a minimal time for grab closing to provide an adjustable constancy of loads and a positive sequential control for the lowering and hoisting modes.

16 Claims, 7 Drawing Figures

AUTOMATIC GRAB CRANE

BACKGROUND OF INVENTION

By way of example of all grab cranes, the operation of a dredge crane operating a grab having plural sides, such as a two sided clamshell bucket in underwater dredging, may be considered. Such involves the sequential steps of lowering, closing, raising, luffing out, opening, luffing in, and again lowering, etc. under changing bottom depths and flowing water. The three steps of lowering, closing and raising are the three along with braking that are the most critical, and are the most difficult to program either manually, or otherwise, because they occur out of sight of the crane operator. Even if visible through clear water over a range of depths it would be difficult to determine visually when the bucket has established a desirable working position with respect to the bottom and is ready for closing to pick up a load in a single pass without either "burying" the bucket or "skimping" the load. Objectionably, slack hoist lines from poor braking can permit the "burying" of a bucket and incur many kinds of delaying complications including the tilting or tumbling of the bucket, improper closing of the bucket, and, undue stress movements on the hoist.

Full automation for a wide range of changing depths and conditions is highly desirable for these three steps. However, confusing conditions are experienced because in the above sequence two non-contiguous steps occur when the bucket is the lightest on its hoist winch, namely, when the winch brake is applied for luffing and opening the bucket, and when the bucket engages the bottom and is closed. Also two non-contiguous steps occur when the bucket is the heaviest on the winch, namely, when being raised and when being lowered. In both, similarities between the alternative steps provide like conditions that are substantially indistinguishable for automated monitoring, and, any requirements or provisions for manual override for these steps involves delays and further complications that permits only partial automation. Additionally, two power efforts are involved and their coordination and control have to be transmitted to the bucket through separate connections additionally carried by the boom. One effort is to open and close the bucket, and the other effort is to raise and lower the bucket. Heretofore, these efforts have generally been controlled separately and manually with a substantial waste of operational time and power. Accordingly, time and labor saving operative automation has heretofore been limited.

SUMMARY OF INVENTION

The words "dredge bucket" or "dredge crane" as hereinafter used may be construed to include all grab cranes in which the development and experimentation indicates preference for hydraulic power in raising, lowering, and closing a clamshell bucket, such as used in dredging, and it is with the coordinated operation of these three functions that the invention is primarily concerned particularly while the grab is under water or otherwise out of sight in handling wet or dry material. Accordingly, the hoist line winch is powered hydraulically; time responsive relays and solenoid valves are used sequentially as controlled by pressure to particularly distinguish between the steps of lowering, bottoming, digging, and raising the clamshell bucket; and, these steps are performed sequentially and temporally as coordinated by electrical circuitry in an economical and efficient hydraulic driven dredge arrangement with uniform results and savings in dredge time.

Further objects of the invention include the provision of grab cranes simplified in structure and control and less complicated to maintain and operate. Hydraulic responses are instantly effective because of an assured incompressibility of the liquid involved. Fewer elements are involved, and, with the vulnerable and adjustable working parts accessibly disposed for ready servicing they are protected above the deck of the dredge where they are substantially free from abrasion by the materials handled. Moreover, the elements can operate in an automatic sequential mode continuously subject to immediate manual take over control when required, or, fail safe at any instant. The bottom sensing circuit can also be adjustably programmed to dig to an operational depth with the hoisting, luffing, and lowering of the bucket at operational speeds that can be adjusted to suit particular work conditions and material handled.

IN THE DRAWINGS

DESCRIPTION OF INVENTION

Figure 1:
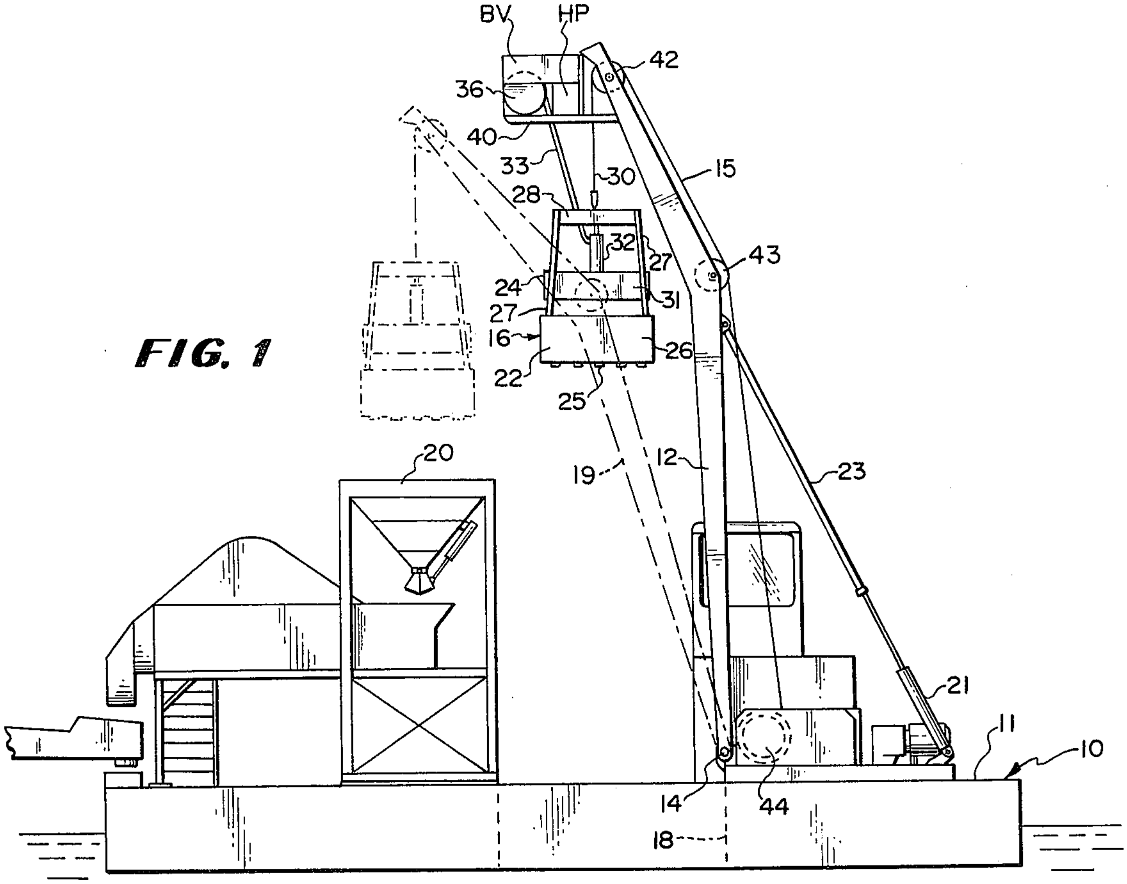
FIG. 1 is a side elevation of a dredge embodying the invention in which the luffing, emptying position is shown in broken lines and the bucket lowering position of the boom is in solid lines. The dredge is in the bucket hoisting mode.
Figure 2:
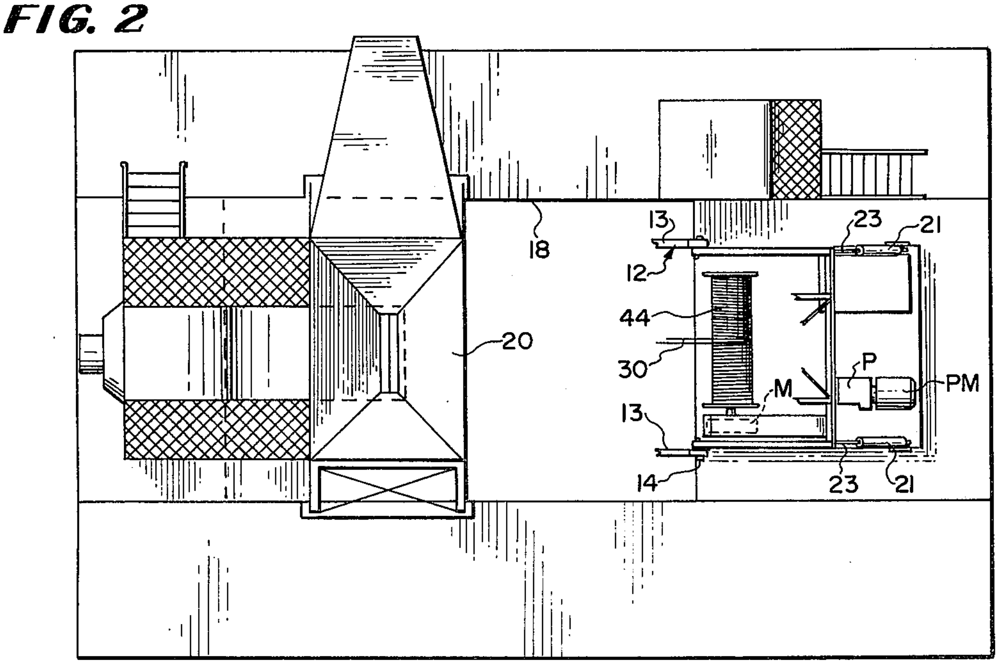
FIG. 2 is a top plan view of the upper part of the boom structure removed to show the relation involving the digging well through which the bucket passes the hull of the dredge barge.

Referring now to the drawings and FIGs. 1 and 2 in further structural detail, a floating dredge 10 is illustrated having an arched shear 12 or "boom" having two legs 13 pivotally mounted at their heels 14 on the deck 11 for movement from its upright position as shown in full lines 15 for hoisting and lowering the clamshell bucket 16 through the digging well 18, to an inclined position shown in broken lines 19 for luffing and opening the bucket to empty its load in the hopper 20. The shear 12 is moved hydraulically between its alternate positions by means of extendible guys 23 that include auxiliary powered hydraulic luffing cylinders 21.

Figure 4:
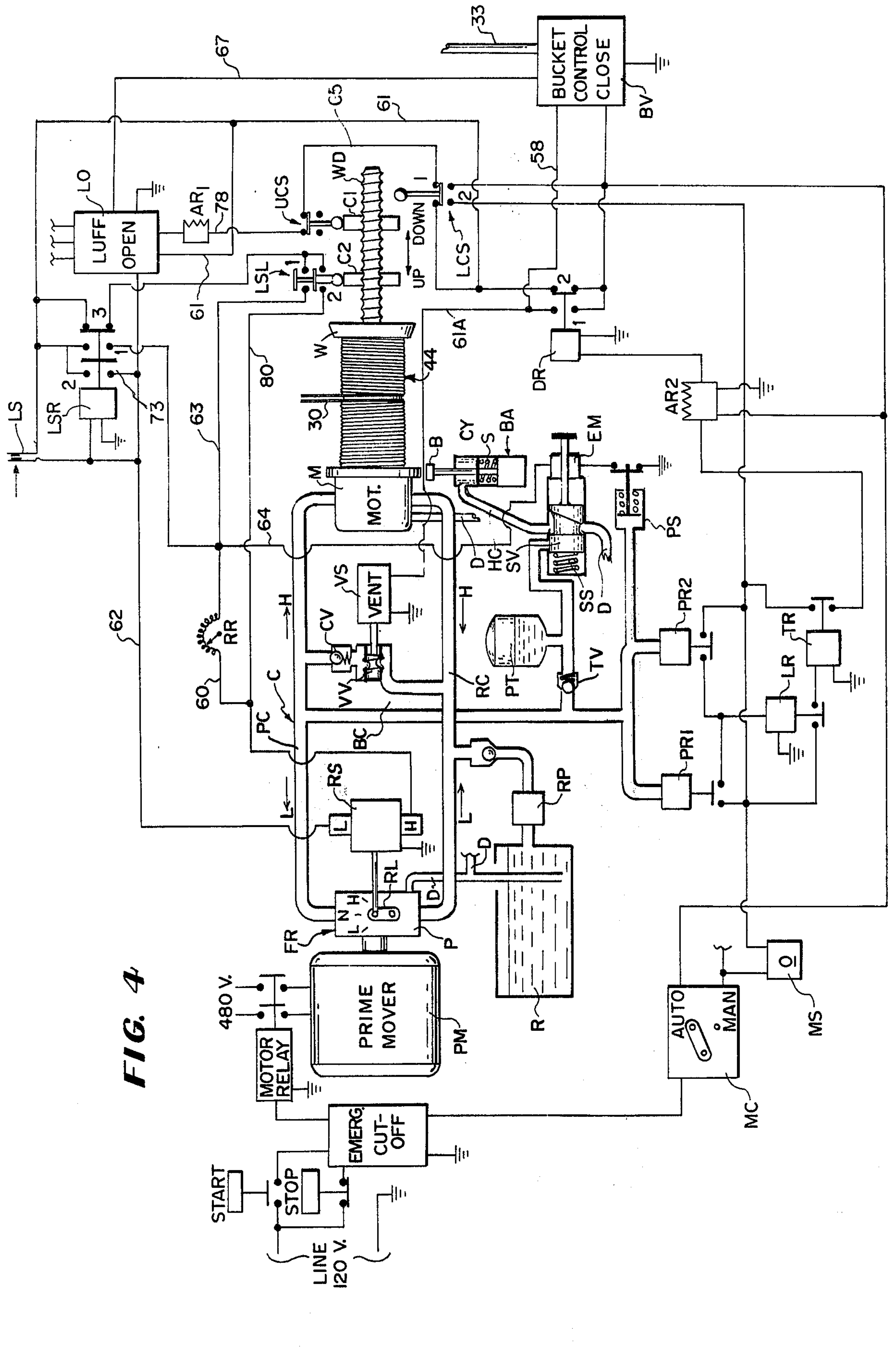
FIG. 4 is a schematic diagram of the electrical and hydraulic controls and the wiring diagram illustrating the invention in a mode preparatory to lowering and releasing the brake.

The clamshell bucket 16, sometimes referred to as a grab bucket, has two semi-circular jaws 22 pivoted to an axle 31 disposed at their radial centers 24, and have toothed lower digging edges 25. At their upper edges 26, or along their upper edges, if underslung, they are pivoted to the lower ends of spreader strut links 27. The upper ends of the links 27 are pivoted on a common axis to a head 28 to which dual hoist lines 30 are attached. Bucket actuating hydraulic cylinders 32 interconnect the axle 31 and head 28 and close the bucket jaws 22 for digging by contraction under hydraulic pressure supplied through the hose 33 by a separate pump HP (FIG. 1) controlled by a solenoid valve BV (FIG. 4). After hoisting the closed bucket 16 for emptying, the relaxation of the hydraulic pressure permits the jaws 22 to open downwardly under their own weight to dump a load. A hose reel 36 carried on a platform 40 at the top of the shear 12 supports the hydraulic hose 33 to pay out and retrieve the hose without slack as the bucket is lowered and raised.

The hoist lines 30 are laid over the head sheaves 42 and guide sheaves 43 on the shear 12 and are wrapped and secured around a hoist winch 44 mounted on the deck 11. The power for the hoist winch hydraulic motor M to raise and lower the bucket is provided preferably by a continuously running positive and variable displacement reversible flow hydraulic pump means P driven by a prime mover PM which may be an electric induction motor as shown when shore power is available, or a speed regulated diesel engine operating at a constant regulated speed.

In the present invention certain pressures may be assumed for explanation purposes in automating a clamshell dredge utilizing hydraulic pressures with controls that distinguish between lowering, bottoming, digging and raising the clamshell bucket in an economical and efficient hydraulic hoist circuit C. The hydraulic circuit C includes the pump P; a flow reversing means FR; the hydraulic motor M; a pressure conduit PC; a return conduit RC; a bypass conduit BC connected between conduits PC and RC; a hydraulic supply cooling reservoir R receiving leakage of pump P, motor M, and brake hydraulic pressure release through conduits D; and a pump RP replenishing the circuit C under pressure. Thus, a liquid solid condition without any expandable compressed fluid entrained therein is maintained in the circuit C by the constant low supply pressure of pump PR, such as 400 p.s.i. that is effective in both the pressure conduit PC and the return conduit RC. This pressure along with pressure induced by the free weight of the open bucket 16 on the winch motor M when being lowered, may develop a hydraulic pressure of 1,200 p.s.i. in the conduit PC. After the bucket enters the water the pressure in conduit PC may drop to 900 p.s.i. due to the effective weight of the bucket being reduced by its buoyancy factor and the inertia of the water resisting its downward movement. The 900 p.s.i. pressure endures without reducing the speed of downward movement of the bucket until the bucket touches bottom to which further consideration is given later. The load lift pressure will be well above 2,000 p.s.i. until the bucket emerges from the water whereupon the maximum lift weight will be experienced when load buoyancy ceases.

As again referred to later, when lowering the bucket 16, the hydraulic flow direction is reversed by the flow reversing means FR and the pressure of 1,200 p.s.i. at the intake of the pump P is developed by the weight of the bucket 16 driving the pump P. In this mode, the load powers the winch, the winch drives its positive displacement motor M and it acts like a "pump" while the positive displacement pump P rotating at its controlled speed becomes a metering device controlling the lowering speed of the bucket through pressure flow in conduit PC.

Figure 5:
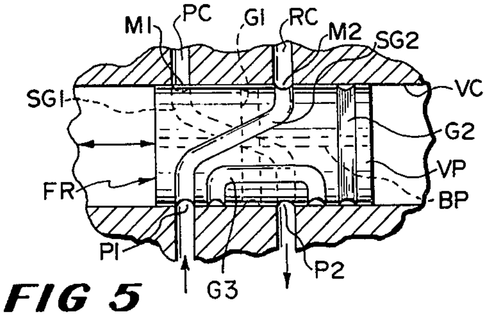
FIG. 5 is a diagrammatic illustration of the flow reversing valve disposed in the lowering mode.

The flow reversing means FR may comprise either a flow-direction reversing valve or a reversible variable displacement pump. Both word have a normally neutral position (FIG. 5) blocking flow into the conduits PC and RC and alternate positions by which the flow-direction in the circuit C, for hoisting, would be in the direction of arrows H, and when reversed for lowering the flow would be in the direction of arrows L (FIG. 4). A reversed flow mode is shown in FIG. 5. Either means that may be used operates valves with a timed progressive closing and opening action and is controlled by a reversing lever RL controlled by a dual reversing solenoid RS normally having a center-off position for neutral N position and controlling the reversing valve for either fast or slow movement.

In this connection the flow reversing valve FR construction is diagrammatically shown in FIG. 5 where a cylinder having axially and equally spaced opposing pairs of ports $M_1$ and $M_2$ for motor connections and $P_1$ and $P_2$ for the pump connections. A piston VP, having a movement dampening bleed passage BP axially through it, has on opposite sides two surface channel grooves $G_1$ and $G_2$ extending 200° and spaced to coact in one position with the axially spaced pump ports P1 and P2 indicating forward and return flow. On the same side of each channel groove there are provided spiral grooves $SG_1$ and $SG_2$, as indicated, also extending 200° with their ends spaced the same distance as the spaced ports but with the ports displaced from the planes of grooves $G_1$ and $G_2$ a distance whereby the piston closes the pump ports P1 and P2 in the neutral position N of the reversing valve. Grooves $G_1$ and $SG_1$ may intersect because neither is connected to a port when the other is.

A further axial groove $G_3$ on the pump port side of the piston has its ends preferably out of communication with the other grooves but opening between them to place the pump ports P1 and P2 in communication with each other when the valve piston VP is in neutral position N and also blocks any flow through ports $G_1$ and $G_2$. Thus, with the deceleration of the winch at the top of the hoist by the rheostat RR, as later described, the application of the brake B can occur just as the flow through the bypass groove $G_3$ (FIG. 5) finally accommodates the complete hydraulic pump output through port $P_1$. This reversing means is relied upon for positively and selectively determining the raising or lowering mode of the winch motor M that is rotatively coupled with the hoist winch 44. In its neutral center-off position N there comparatively is no longer a higher pressure in the conduit PC except when the winch supports a load without the application of the winch brake.

Thereby, in position H to hoist the bucket 16, the prime mover PM powers the pump P through the reversing control FR to drive the hydraulic motor M for hoisting the bucket and this places one of the higher pressures (2,000 p.s.i.) in the conduit portion PC. In position L to lower the bucket the flow-direction reversing means FR reverses the flow-direction in conduits PC and RC, the weight of the bucket 16 reversely rotates the motor M and drives the hydraulic fluid in the reverse direction as indicated by arrows L, and, this places the other higher pressure (1,200 p.s.i.) also in the conduit portion PC.

Accordingly, in both instances, the higher hydraulic pressures when present are always confined to the one leg PC of the circuit C as well as the pressure 900 p.s.i.

which occurs when the bucket enters the water. In the neutral position N the reversing control re-circulates hydraulic fluid in the pump while the circulation of hydraulic fluid in the circuit C is blocked thereby locking the winch motor M against rotation. This condition supports the bucket at a fixed height with resulting higher pressure in the conduit PC holding the winch motor M against rotating. Any higher pressure can be relieved by applying the winch brake B.

The bypass conduit BC interconnects the two conduits PC and RC in an orientation that is parallel to the pump P and to the motor M and it includes a vent valve VV operated by a solenoid VS as a forward flow valve that is protected against counter pressure and backflow by a backflow check valve CV. The valve VV maintains the higher pressure in the pressure conduit PC whenever the winch and motor are to be rotated. But when the winch is to be stationary without movement of the flow reversing valve FR to its neutral position N the vent valve VV preferably a spool valve may be opened by solenoid VS to vent the high pressure in conduit PC to the return conduit RC for a pressure equalization as when the bucket is on the bottom. This enables the speed governed pump P to continue operation and re-circulate without load or working pressure thereon. Thus, the valve VV may be opened and closed by the digging relay switch DR.

The brake B is controlled by the applicator BA which has a spring S to apply the brake B and a pressurizable cylinder CY which receives hydraulic fluid to overcome the spring S and release the brake B. A standing source of pressure is provided by the tank PT having an inert gas in it compressed by hydraulic fluid supplied from conduit PC as accumulated and trapped by the check valve TV at the maximum pressure exerted in conduit PC when the bucket with its load is being hoisted. When the electromagnet EM is de-energized by the opening of the pressure switch PS at low pressure the spool spring SS will urge the valve SV to its normal position shown in FIG. 4 venting the pressure cylinder CY to the reservoir R through the drain D. Thereupon, the spring S will apply the brake B and incidentally provide electrically and hydraulically a fail safe arrangement regardless of bucket position. Then, the energization of the electromagnet EM moves the spool valve SV to its alternate position applying pressure from the tank PT to the cylinder CY thereby releasing the brake B. The de-energization of the electromagnet EM is also accomplished by the opening of limit switch LSL1 as later explained to apply the brake at the luffing position of the bucket.

Coacting with and cooperating in the operation of the arrangement described is a worm drive WD rotated by the winch W. It axially displaces two cam followers C1 and C2 to actuate the cam switches LCS and UCS alternately, and sequential switches LSL 1 and 2. Cam switch LCS2 is closed to power the underwater controls just after the bucket 16 enters the water where the pressure drops to said 900 p.s.i. Switch LCS1 is closed for out of water operations and when the upper cam switch UCS is actuated as the bucket nears the upper hoist limit the luffing control is made ready. Sequential switches LSL 1 and 2 terminally slow down and stop the hoisting for application of the brake B during the luffing and opening of the bucket.

Figure 7:
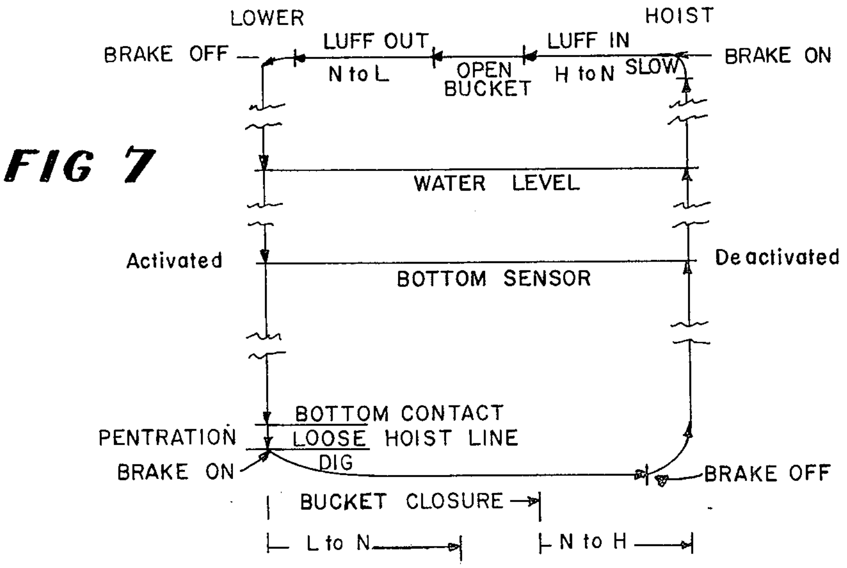

By way of illustrating the sequence of steps performed, the cycle of the grab operation is indicated in FIG. 7 in which arrows indicate the grab movement and the sequence desired. The grab, when emptied, is open and is luffed out to its lowering position, the brake B is released, and the grab is lowered. When submerged, the effective weight of the grab is decreased on the hydraulic system. This decrease in effective weight is followed by activation of the bottom sensor means PR1 and PR2 by the winch W closing the cam switch LCS2. The sensor means responds immediately to any hydraulic pressure charge occassioned by the bucket touching the bottom and this triggers the timing means LR and TR which provides a predetermined fraction of a second delay that permits limited penetration and applies the brake B to provide a predetermined looseness in the hoist line 30. The bucket is then closed to dig to a depth permitted by the hoist line looseness after which the brake B is released and hoist begins followed by deactivation of the bottom sensor. When the bucket is raised to its open position the brake is again applied and the loaded bucket is luffed to its dumping position. There the bucket is opened to discharge its load and is ready for a repeat of the cycle.

More particularly in detail, assuming a starting point, the lowering solenoid L is energized by closing the lowering switch LS manually or automatically. Switch LS also energizes relay LSR to close its self-holding switch LSR2 through normally closed switch DR2, connection 61 and 62 to provide the bucket lowering mode with switch LSR1 closed and switch LSR3 open. Then the worm drive WD closes the cam switch LCS2.

Assuming as a starting point that the lowering solenoid L is energized right after the bucket enters the water readies two pressure responsive solenoids PR1 and PR2 to close switches responsive to the pressure in conduit PC as adjusted with respect to the 900 p.s.i. This readiness is established automatically, and when the bucket engages bottom the pressure in conduit PC is pulsed momentarily either positively or negatively, or both, and actuates one or both of the pressure relays, PR1 and PR2. Relay PR1 will detect an increase in pressure if there is any tendency for the bucket to tip or tumble or place undue stress on the hoist line 30 while relay PR2 will monitor a drop in pressure. The response will establish a spikelike pulse of very short duration but one that is long enough to trip a latching relay LR to record the pulse long enough to utilize it to actuate a timer relay TR that is adjustable for closing within a range of a second, e.g. approximately .3 of a second. This adjustable recording provides both a desired earth penetration by the bucket and a desired slight overrun of the winch 44 for it to pilot the digging depth limit of the bucket.

When the timer delay relay TR closes five further operations occur, namely:

1. the digging relay DR closes switch DR1 to ready underwater operations and de-energizes above water operative circuits by opening switch DR2 and de-energizes the self-holding lowering solenoid relay LSR to open switch LSR 2 and close switch LSR3 with switches LSL1 and LSL2 closed;
2. a pressure vent valve solenoid VS is de-energized or energized either by opening or closing switch DR1 or opening switch DR2, respectively, to equalize pressures between conduit portions PC and RC depending upon to which switch connection 61A is made. The vent period is the same;
3. the resulting pressure drop in conduit PC registered by solenoid PS opens its switch and de-energizes the electromagnet EM to permit the spring SS to move the spool valve SV to vent the hydraulic pressure in the brake applicator BA whereupon the spring S thereof applies the brake B to the winch 44;

4. the closing of the switch DR1 activates the bucket control BV and times a hydraulic pump HP (FIG. 1) through the connection 58 to pressurize the bucket hose 33 and thereby powers bucket cylinder 32 (FIG. 1) to close the bucket; and,
5. the opening of switch DR2 opens the supporting circuit 61, later described, and de-energizes the solenoid L of the reversing control RS to release and permit the valve FR (FIG. 5) to move to neutral position N in which the hydraulic fluid is recycled through passage $G_3$ to the pump P without any pressure differential in the circuit C, and, leaving the winch brake B applied.

Accordingly, with the speed of the lowering bucket adjustably held constant for all depths the desired earth penetration at the bottom may be controlled with a timed termination of the lowering after contact, or, the speed of lowering or both.

Figure 3:
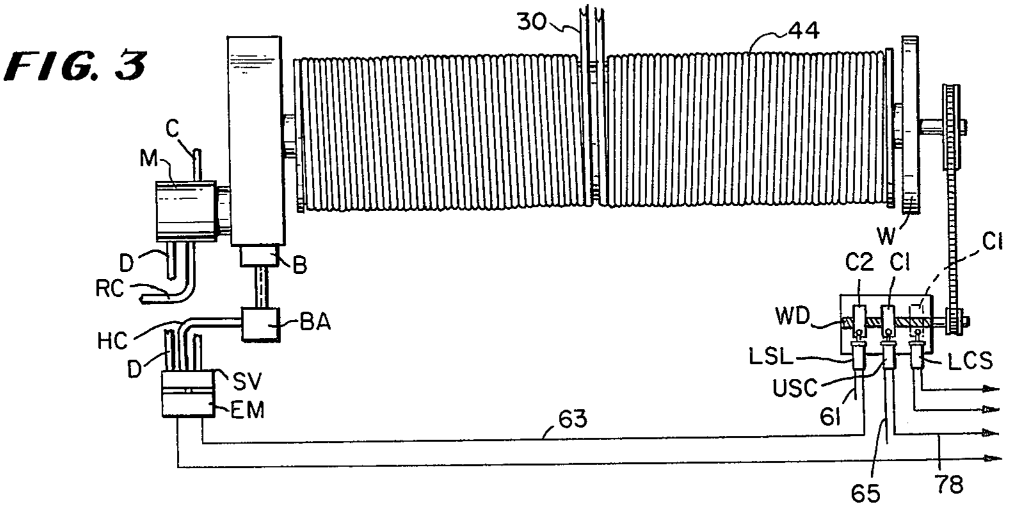
FIG. 3 is a simplified illustration of the winch and limit switch and brake mechanisms employed therein.

FIG. 3 is a simplified illustration to indicate several mechanical arrangements that provide mechanical advantages for electrical and hydraulic components and in which speed reduction is employed to drive the winch W with a hydraulic motor M so that tension changes on the hoist lines are immediately substantial and are reflected in the hydraulic circuit C to operate the pressure responsive relays PR1 and PR2 and thereby attain both the desired earth penetration without burying the grab bucket 26 and provide a proper slack in the hoist line 30 to limit the digging depth of the grab bucket.

The time to complete a closing of the bucket is adjustably measured in seconds by the digging relay DR. The slight overrun in the hoist line is taken up during the digging as adjustably controlled by the penetration time allowed by the timer relay TR so that the hoist line is quickly tightened and becomes weight bearing and the bucket will dig no deeper than desired. Automatically uniform repetitive results are accomplished with no delays. Thereby, constancy of bucket loading is assured.

When switch DR1 is closed for the digging time cycle, switch DR2 is open thereby deenergizing through line 61 the self-holding switch LSR2 for the relay LSR, thereby opening switch LSR1 and closing switch LSR3.

At the end of the timed digging cycle, and with timer relay TR already open, the self-holding digging relay DR is released, thereby opening its switch DR1 and again closing its switch DR2 current through switch LSR3 fully energizes the solenoid H through closed cam switch LSL2 for full hoist speed. Thereupon, 1) solenoid H of the reversing solenoid RS being energized through connections 80, 63 and 60 and rheostat RR, switch LSR1 and 2, the electromagnet EM is energized to pressurize cylinder CY and release the brake B. Energization of the electromagnet EM is through connections 63 and 64, switch LSL1, both circuits being connected through connection 61 to switch DR2; 2) the vent solenoid VS recloses the vent valve VV to supply hydraulic pressure for the hoisting mode; and, 3) the brake electromagnet EM is also energized from connections 63 and 61 through switch LSL1 to release the brake B at the same time that the hoisting solenoid H of the reversing solenoid RS is energized. Thereafter, the reversing solenoid RS moves the flow reversing valve FR progressively from its neutral position N as the brake B is released to the hoist position H to provide a gradual increasing flow of hydraulic fluid, and, the motor M smoothly picks up the bucket and its load.

As the winch makes its first few turns the cam C1 releases the lower cam switch LCS for it to open its contacts 2 and closes its contacts 1 as shown in FIG. 4. Opening switch LCS 2 de-activates the bottom sensing circuits including the pressure responsive solenoids PR1 and PR2 before the bucket leaves the water.

As the bucket moves upwardly with the switches DR1 and LCS1 closed the further control of the bucket is transferred to the luff control LO through connections 65 and 78 since the upper control switch UCS is closed as the bucket approaches its upper hoist limit. The switches LCS1 and UCS serve essentially to assure that the bucket is at a luffing level before any luffing procedure is powered and triggered.

With the now closed switch LCS 1 and the closing of the UCS switch by worm movement of the cam C1, the luffing mode is made ready and the rapid hoist and the pressurizing of the brake applicator BA is being maintained through closed switches LSL1 and LSL2, respectively, including parallel connections 80 and 60 for switch LSL2, and connections 60, 63 and the rheostat RR for switch LSL1.

Figure 6:
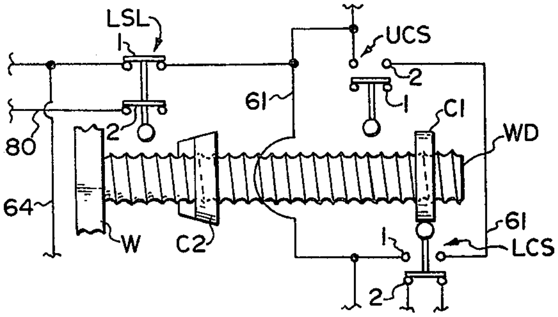
FIG. 6 is an enlarged portion of the circuit illustrated in FIG. 4; and, FIG. 7 is a diagrammatic representation of the essential operational steps occurring in one cycle of bucket operation.

The cam-operated upper limit switch LSL comprises a pair of switches LSL1 and LSL2 which may be micro switches that are opened sequentially by an inclined cam C2 (FIG. 6) carried on the worm drive WD. The switch LSL2 is the first to open and switch LSL1 is the last to open in the hoist mode.

Then when switch LSL2 is opened by cam C2 the flow of electrical current to the hoist solenoid H is restricted to the rheostat RR which is adjustable to deenergize the hoist solenoid H progressively and permit it to gradually move to the neutral position N and thereby gradually restrain hydraulic flow to provide a slow down and a terminal creep that ultimately opens switch LSL1. Thereupon, the brake solenoid BS connected to connection 63 is de-energized and the brake B is applied to the winch 44. During the hoisting operation the pressure tank PT has its pressure replenished for the next lowering and digging modes.

Thereafter, the luff control L0 takes over to actuate the luffing cylinders 21, releases the bucket cylinder 32 to permit the bucket 16 to open, and then return the shear 12 to the bucket lowering position at the terminus of which a contact switch LS is closed in the luffing control that is in circuit with the connection 61 to energize the lowering switch relay LSR, and close switches LSR 1 and 2 and open switch LSR3. Closing the switch LSR 1 energizes the brake electromagnet EM through connection 64 to release the brake B while closing of switch LSR2 energizes the solenoid L of the reversing solenoid RS and provides a holding circuit through connection 73 between connection 61 and connection 62 which energizes the lowering solenoid L for the lowering mode. The opening of switch LSR3 isolates switches LSL1 and 2 from connection 61. Then when the DR switch 2 is opened the holding circuit 73 is released thereby releasing the relay LSR which in turn releases the reversing solenoid RS, returns it to its neutral position N and applies the brake B for the digging operation under the control of relay switch DR1 as already described. Opening switch LSR3 cuts out any energization related to the hoisting mode.

In order to assure release of the brake B regardless of the pressures in the conduit C, the high pressure in the tank PT is utilized as already described to release the brake B in a relation strictly timed with respect to the reversing solenoid RS.

It may be noted that without the source of pressure in the pressure tank PT being present and the flow reverser FR in neutral position N with the brake B applied, the pressure in conduits PC and RC may equalize since the weight of the bucket is carried by the brake B. Under this condition the pressure switch PS may be operating to de-energize the electromagnet EM until the flow reverser FR moves from its neutral position N to either its lowering position L or hoist position N. Or, the hydraulic flow stoppage of the flow reversing valve FR in neutral position N might carry the weight of the loaded bucket 16 during the luffing operation without the brake B. However, it is preferred to control the application of the brake B by the separate circuit controls as described for a fail safe in event of a power failure. In any event, until the brake B is applied the weight of the bucket 16 and its load could be carried by the pressure in the conduit portion PC when the flow reverser FR is in neutral position N.

Although interlocking circuit isolating switches or relays, including automatic safety relays AR1 and AR2, can be employed to de-energize circuits when not employed during a portion of the full cycle of operation it is preferred to segregate the lowering-digging circuit from the hoisting-luffing-opening controls by the utilization of the additional upper limit cam switch C2 and switches LSL and LSR 1 and 2 for separately applying the brake B and returning the flow reverser FR to neutral position N. Accordingly, the cam switches UCS and LCS preferably do not overlap in their closing although one may set up the back contacts of the other as shown for a certain stepped relationship as described.

Furthermore, since the operation of the bottom-sensing-timing portion of the logic circuit illustrated is semi-isolated from the remainder of the circuit, it still will be operative to perform automatically when called upon to do so even though the main control MC is set for manual operation. It is arranged to perform as a unit and can also be actuated manually only after the bucket enters the water, the manual switch MS being connected in parallel with the cammed limit switch LCS2 for this purpose. The brake control circuit preferably is automatic at all times when the pressure switch PS is de-energized intentionally or otherwise in a fail-safe relation, the brake being applied whenever adequate bucket support pressure is absent in the pressure conduit PC as when there is either failure of electrical power or a diesel breakdown. This is accompanied automatically with the mechanical application of the brake B. Moreover, the digging relay DR is controlled solely through the bottom-sensing relays PR1 and PR2 in timed relation with the vent solenoid VS since it is undesirable for the bucket to dig-bury itself when not restrained at a fixed level by the winch brake B. Even upon power failure or emergency cut-off in any mode or operation or when the pressure switch PS is opened for any reason, the spring SS engaging the spool valve SV will enable the application of the winch brake B and will actuate the flow reversing means FR for a stand-by neutral position N.

What is claimed is:

1. In a grab crane having a power driven hydraulic positive displacement pump and a hoist means driven by a hydraulic positive displacement motor for raising and lowering the crane grab, conduit means including parallel high pressure conduit and low pressure conduit interconnecting said pump and motor in series flow relationship, switch means controlled by said hoist means and activated when said grab is submerged in water, means for detecting grab contact with submerged work material including hydraulic pressure responsive means activated by said switch means and connected to and critically responsive to a change of hydraulic pressure in said high pressure conduit from that pressure that is induced therein by the effective weight of the grab being lowered empty under gravity through the water at a controlled rate, means actuated by said activated hydraulic pressure means for changing the pattern of hydraulic flow in the conduits between the motor and pump, and control means actuated by said activated pressure responsive means for closing said grab in timed relation to said change in hydraulic pressure.

2. In the crane defined in claim 1 in which said actuated control means includes a time delay means interconnecting said activated hydraulic pressure responsive means and said control means.

3. In the crane defined in claim 1 in which said actuated control means includes a vent valve opening a bypass conduit between said high pressure and low pressure conduits to drop the pressure differential between the conduits.

4. In the crane defined in claim 2 in which said actuated control means includes a solenoid valve reversing the direction of hydraulic flow in said hydraulic motor during actuation of said time delay.

5. The crane defined in claim 3 in which the control means includes a time delay means closing said bypass at the end of said time delay period.

6. The crane defined in claim 3 including means responsive to said pressure differential drop for braking said winch means.

7. In a crane providing hoisting and lowering energy pressure differentials and having a grab raised and lowered by a hoist means subjected to said pressure differentials and brake means holding the hoist means against rotation when there is no substantial pressure differential, the combination of means detecting a change in the pressure differential incurred by initial contact of the grab with work material, time delay means actuated by said detecting means for timing grab penetration of the work material after said initial contact therewith, means actuated at the termination of the penetration period of time for braking said hoist means against rotation to support said grab, digging relay switch means activated by said time delay means for controlling the closure of the grab during the activation of said brake means for limiting the digging depth of the closing grab, and means for applying a hoisting hydraulic pressure to the hoist means and releasing said brake upon closure of said grab.

8. A crane as defined in claim 7 in which said monitoring means comprises a pressure relay responsive to a drop in the pressure differential and a pressure relay responsive to an increase in the pressure differential.

9. A crane as defined in claim 7 in which said lowering differential pressure is terminated to activate the application of said brake means during said time delay and including means gradually increasing the flow rate of hydraulic hoisting fluid following said time delay.

10. A crane as defined in claim 7 in which the energy pressure differential is a hydraulic fluid under pressure.

11. A crane defined in claim 7 in which said braking means includes an actuator carrying a movable brake member, resilient means urging said brake into engagement with the winch positive displacement means for moving said brake against said resilient urging means and out of said engagement, and.

means controlled by said time delay means controlling movement of said positive displacement means.

12. In a crane having a hydraulically operated hoist means for lowering an open grab, the combination of pressure responsive means detecting the change of hydraulic pressure occurring during lowering of the grab when the grab contacts the work material, latching relay means actuated by said responsive means for recording said detected change, time delay relay means actuated by said latching relay means to vent said pressure responsive means, and, brake means actuated by said time delay relay means for venting the hydraulic lowering pressure and locking said hoist means against rotation.

13. A crane as defined in claim 7 in which said pressure differential is induced by a constant speed positive displacement variable flow pump means that controls the hoisting and lowering speeds of the hoist means.

14. A crane as defined in claim 7 in which the hoist means includes a positive displacement motor inducing the lowering pressure differential upon the winch as an inlet pressure upon the pump with the pump metering the hydraulic flow.

15. In a grab crane having a hydraulically operated hoist means controlled by an ascertainable hydraulic pressure for lowering the grab open under water, the combination of pressure responsive means for detecting the change in said hydraulic pressure occurring when the lowering grab contacts the work material, latching relay means actuated by said responsive means for recording said detected change, timer relay means actuated by said latching relay means to provide a timed response period for limited grab penetration of said work material, time delay means actuated by said timer relay means to provide a grab digging interval of time, pressure equalizing means activated by said timer relay means to vent said hydraulic pressure, means actuated by said pressure equalizing means for braking said hoist means, means actuated by said time delay means for closing said grab and picking up a load, and means actuated by said time delay means sequentially with said grab closing means for de-activating said pressure equalizing means to restore hydraulic pressure upon said hoist means to hoist the loaded bucket.

16. In a grab crane having a hydraulically operated hoist means controlled by an ascertainable hydraulic pressure for lowering its grab open under water, the combination of pressure responsive means for detecting the change in said hydraulic pressure occurring when the lowering grab contacts the work material, means actuated by said responsive means for recording said detected change and including a timer relay providing a timed response period for limited grab penetration of said work material, time delay means actuated by said timer relay to provide a grab digging interval of time, pressure equalizing control means activated by said timer relay to vent said hydraulic pressure and brake said hoist means, means for closing grab responsive to said vented loss of pressure to pick up a load, and means actuated by said time delay means sequentially with said grab closing means for de-activating said pressure control means to restore hydraulic pressure upon said hoist means to hoist the loaded grab.

* * * * *